H. W. JACOBS & H. H. LANNING.
APPARATUS FOR PURIFYING GAS.
APPLICATION FILED MAY 18, 1912.
1,051,957. Patented Feb. 4, 1913.
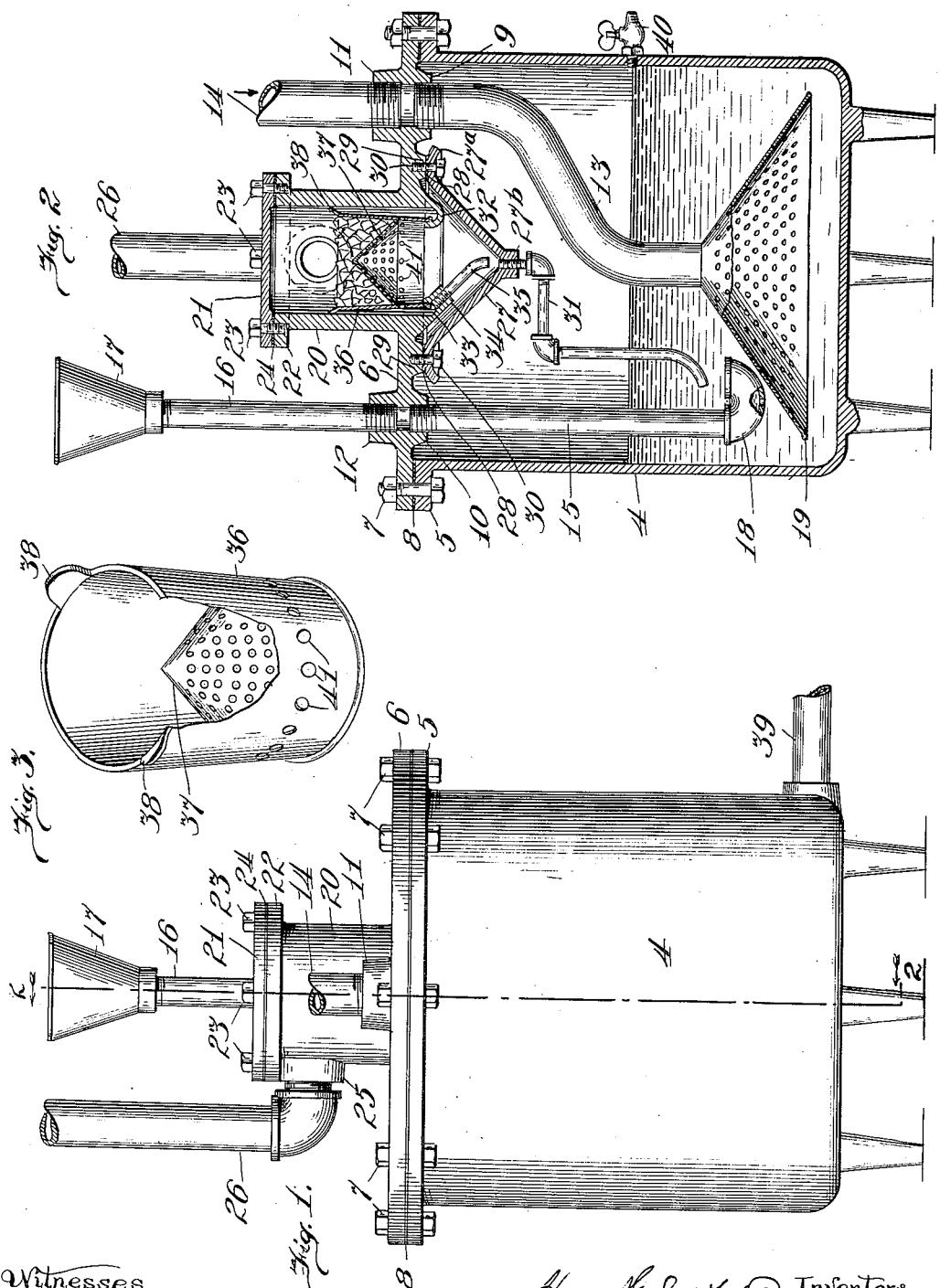

UNITED STATES PATENT OFFICE.

HENRY W. JACOBS AND HOWARD H. LANNING, OF TOPEKA, KANSAS.

APPARATUS FOR PURIFYING GAS.

1,051,957.  Specification of Letters Patent.  Patented Feb. 4, 1913.

Application filed May 18, 1912. Serial No. 698,304.

*To all whom it may concern:*

Be it known that we, HENRY W. JACOBS and HOWARD H. LANNING, citizens of the United States, and residents of Topeka, in the county of Shawnee and State of Kansas, have invented certain new and useful Improvements in Apparatus for Purifying Gas, of which the following is a description, reference being had to the accompanying drawing, which forms a part of our specification.

Our invention relates to an apparatus adapted for use as a gas purifier, wherein the raw or impure gas is purified by being passed through a proper chemical solution of such a nature that the impurities will be removed through the chemical reaction between the substance or chemicals in solution and the impurities carried by the introduced raw gas; the solution being of such character that the chemical reaction will result in substances entirely in a liquid or solid form.

The object of our invention is to provide an apparatus wherein the gas will be permitted to flow freely and the gas passages will not become clogged or restricted by the impurities or sediment which may be present in the gas itself or which may result from the chemical reaction taking place between the chemical or purifying solution and the impurities in the gas.

Another object of our invention is to provide an apparatus wherein the greatest possible efficiency in operation may be obtained through the even distribution of the volume of gas in small streams or bubbles throughout the entire chemical or purifying solution, thereby facilitating the necessary chemical reaction by bringing the entire body of purifying solution into action.

Another object of our invention is to provide an apparatus wherein the gradual loss of the purifying solution, resulting from its being conveyed out of the apparatus by the outflowing gas in the form of a spray, will be prevented.

A further object of our invention is to provide an apparatus of simple and durable construction, and so arranged that ready access to all of the inclosed parts may be had for the purpose of cleaning and examination, as will be readily apparent from the following description and accompanying drawing.

Figure 1 is a side elevation of our improved apparatus with portions of the pipes or conduits shown broken away. Fig. 2 is a vertical sectional view taken on the line 2—2 of Fig. 1, looking in the direction of the arrows; the conduits being shown in elevation. Fig. 3 is a detail view in perspective of the filter can or receptacle.

In the particular construction of our invention, as disclosed in the drawing, the apparatus consists of a suitable vessel or receptacle 4 adapted to retain a liquid solution; being shown provided with a closed bottom and an open top. The upper or open end of the receptacle 4 is preferably provided with an annular flange 5 provided with a suitable number of bolt-receiving openings. A cover 6 is secured to the flange by a suitable number of bolts 7; a gas tight joint being formed between the cover and receptacle 4 by a suitable gasket as shown at 8.

As we prefer to have the gas and solution conveying conduits enter the apparatus through the cover as shown in the drawing, in order that gas tight connections may be formed, we provide the under side of the cover 6 with the bosses 9 and 10; these bosses 9 and 10 being placed at points coincident with bosses 11 and 12 which are formed integral with the upper or outer side of the cover. The registering bosses have openings extending entirely therethrough; and both ends of the openings are preferably screw-threaded, as shown. The boss 9 receives the threaded end of the pipe 13; while boss 11 receives the threaded end of the conduit or pipe 14, which may practically be considered a continuation of pipe 13 as both sections of pipe have communication with each other by reason of the opening in bosses 9 and 11. Boss 10 on the under side of cover 6 receives the threaded end of pipe 15; while boss 12 on the upper or outer side of the cover receives pipe 16, the upper end whereof is provided with a funnel 17, which may either be formed integral with the pipe or otherwise secured thereto and facilitates the pouring of liquid into the pipe; while the lower end of the pipe 15 is provided with the return bend or trap 18 which enables a liquid seal being formed against the passage of gas. In order to drain the trap 18 when desired, the bend may be provided with a small opening in the bottom part thereof just sufficient to permit the contents of the trap to slowly seep through.

The lower end of conduit or pipe 13 is provided with a flared or funnel shaped end 19, which extends into close proximity to the bottom of the receptacle 4, and is open at its lower side, while the side walls thereof are provided with a suitable number of perforations as clearly shown in Fig. 2. In order to properly place the flared or funnel shaped end 19 in a central position within receptacle 4, pipe 13, which is secured to the cover at one side of the receptacle, is provided with a suitable off-set or bend as clearly shown in Fig. 2.

The cover 6 is provided with a gas-receiving chamber or dome 20, preferably centrally located. The dome 20 is shown formed integral with the cover 6 in the drawing as being the preferable construction, but it is evident that the dome might be made separate and otherwise secured to the cover; it being understood, of course, that the bottom of the dome is open to the chamber or receptacle 4 as clearly shown in the drawing. The dome 20 is preferably provided with a removable top or cover 21. In order to permit a gas tight connection being formed, it is provided at its upper or open end with the flange 22 to which cover 21 may be secured by any suitable mechanism as for example bolts 23; with a gasket 24 placed between the cover and the flange 22. The side wall of dome 20 is shown provided with a boss 25 which has an opening extending therethrough and screw-threaded to receive the end of the outlet or discharge conduit 26; the conduit 26 being preferably arranged to communicate with the side of the dome, thus permitting the cover 21 to be removed without interfering with the pipe or conduit 26.

Removably secured to the under side of cover 6, and disposed beneath the mouth or lower opening of dome 20, is a deflector member 27, see Fig. 2. The deflector 27 is preferably made funnel shape; with the upper edges flared outwardly and curved backward somewhat toward the apex of the deflector as clearly shown at 27ª. The rounded upper edge of the deflector 27 is provided with a number of circumferentially arranged bosses 28 which are intended to register with and bear against bosses 29 circumferentially arranged on the under surface of cover 6. The bosses 28 on the deflector 27 are provided with openings therethrough, while the bosses 29 on the under side of the cover are tapped to receive the threaded ends of bolts 30 whereby the deflector is removably secured to the cover.

The purpose in providing the registering bosses just described is to leave a suitable space or passages intermediate of the different sets of bosses and between the deflector and the cover for the passage of the gas from chamber 4 into the dome 20. The downwardly presented apex of the hollow cone or funnel shaped deflector 27 is slightly extended as shown at 27ᵇ and is provided with an opening extending longitudinally therethrough, communicating with the interior of the deflector; and this opening is tapped to receive the end of a drain pipe 31, so that any fluid that may collect in the deflector 27 will flow through pipe 31 and back to the lower part of chamber 4. In the particular construction illustrated in the drawing, the drain pipe 31 is off-set or provided with several bends so that the discharge end of the pipe 31 will be to one side of conduit 13 and not interfere therewith; the drain pipe 31 being made to extend somewhat below the normal fluid level in chamber 4 as clearly shown. The lower or discharge end of pipe 31, in addition to extending beneath the normal fluid level is also preferably curved or bent away from its longitudinal axis so as not to have the discharge orifice presented directly toward the perforations, in the funnel shaped end 19 of pipe 13, see Fig. 2 thus preventing the gas escaping through the perforations from entering or rising up in pipe 31.

Surrounding the lower opening of dome 20,—and in the particular construction illustrated, formed integral with the under side of the cover 6,—is an annular upwardly turned flange or projection 32, which extends into the opening of the dome and is shaped so as to conform to the sloping wall or inside of deflector 27, and leave an intervening space between its lower wall and the inner face of the deflector.

The annular upwardly turned flange 32 is arranged to provide an annular channel 33; and at a suitable point the flange or projection 32 is provided with a downwardly presented boss 34 which is drilled and tapped to receive a drain pipe or spout 35, the lower end whereof preferably terminates at a point slightly above the point of communication between the inside of deflector 27 and drain pipe 31, so that any fluid which may collect in channel 33 will be discharged through spout 35 into the inside of deflector 27 below the stream of gas and drained off by pipe 31.

In order that any moisture or fine drops of liquid which may be carried upward by the current of gas passing through dome 20 may be collected and removed from the outgoing gas, we provide a filter can or receptacle 36, shown in detail in Fig. 3. This filter can or receptacle is preferably made of sheet metal rolled into the form of a hollow cylinder provided with a cone shaped bottom 37, provided with a suitable number of perforations and secured to the side walls of receptacle 36 a short distance from the bottom or lower end, so as to permit the lower end of receptacle 36 to fit into the channel 33 formed by the upwardly turned annular projection 32. The receptacle 36 is intended to be filled with suitable material such as small portions of porous brick or pumice stone whereby any particle of fluid carried by the rising current of gas will be collected. The upper edge of receptacle 36 is shown provided with two outwardly bent lobes 38 whereby the upper part of the receptacle will be properly centered in the dome 20 and held away from the side walls of the dome as clearly shown in Fig. 2.

The receptacle 4 is provided at its bottom with a suitable drain pipe as at 39,—which pipe may be provided with a shut off valve, not shown,—whereby the contents may be drained from the receptacle when desired. The side wall of receptacle 4 is also provided with a pet cock 40 located at a suitable distance above the highest perforations in the funnel shaped end 19 of pipe 13; the object of the pet cock being to gage the fluid level within chamber 4.

In operation, pet cock 40 is opened and a proper chemical solution introduced into receptacle 4 through the funnel 17 and pipes 16 and 15, until the solution reaches the horizontal level or plane occupied by the pet cock, when the latter is closed and the introduction of solution discontinued. The raw gas to be purified is then allowed to flow through pipes 14 and 13, from the source of generation and discharged into the liquid solution with which receptacle 4 is provided. The inflowing gas is divided into small streams or jets by the perforations in the funnel shaped end of pipe 13 and rises in bubbles through the chemical solution. As the funnel shaped end 19 is open at the bottom, any solid material mingled with the gas will be allowed to escape into the bottom of receptacle 4 without having to pass through the perforations. By leaving the bottom of the funnel shaped end 19 open as described, it will also prevent any excess back pressure on the gas supply in the event that gas is supplied in too large a volume to be taken care of by the perforations. After the gas is discharged in small jets or streams through the perforations in funnel shaped end 19, it passes through the chemical solution in chamber 4 and becomes purified through the chemical reaction between the substance in solution and the impurities in the gas. The rising gas will strike the under sloping surface of deflector 27 and be compelled to pass around the somewhat downwardly curved upper edge 27$^a$ and then through the space intervening between the upper edge of deflector 27 and cover 6. By providing the upper edge of the deflector with the downwardly curved edge 27$^a$, the stream or body of liquid carried upward by the gas, especially if the passage of gas through the solution is rapid enough to produce atomization of the liquid, will strike the under side of the deflector 27 and be reversed in its movement by the downwardly curved upper edge, thereby causing the heavier matter or stream of liquid to descend into the lower part of chamber 4 with a force proportional to that of its original momentum, which force would be augmented by the action of gravity, so that the liquid will be thrown into the lower part of the chamber in spite of the upward current of gas. In practice it has been found, however, that some more finely divided drops or portions of liquid are carried by the current of gas through the apparatus in spite of the deflector just described. These finely divided drops or portions of liquid will be carried by the current of gas through the passages or space between deflector 27 and cover 6 and around the projection 32 into the dome and unless means were employed to prevent it, the solution would eventually be carried out of the apparatus and lost, especially if the gas is passed through with extraordinary rapidity. By reason of the projection 32, however, the stream or current of gas is made to make an abrupt or sharp turn in order to enter the dome 20, and this abrupt turn will cause a considerable portion of the finely divided portions or drops of fluid to be thrown out of the gas current or stream and into the basin formed by upper side of deflector 27. The fluid thus collected in the deflector 27 will drain back into reservoir 4 through the drain pipe 31 and be discharged beneath the level of the fluid. The discharge end of pipe 31, as previously described, in addition to being slightly curved at the discharge orifice so as not to have the orifice presented directly toward the perforations in funnel shaped end 19 is also submerged in the fluid, thereby preventing gas flowing upward through pipe 31 and thus interfering with the proper drainage of the basin formed by the deflector 27. Before the gas entering dome 20 reaches the discharge conduit or pipe 26, it is made to pass through the broken and porous material in filter receptacle 36, whereby any particles of fluid, which may have escaped the action of the previously described mechanism by reason of the minuteness of the particles, will be removed. It has been found in practice, that the desired result is accomplished by employing small particles of broken brick or other porous material, thereby presenting a great amount of surface for the gases to baffle against; and the porosity of the material used in the filter or receptacle 36 tends to hold the drops of liquid against the gas stream by virtue of the high surface tension or skin friction to the passage of fluid. The fluid collected by the porous material in receptacle 36 will gradually work its way to the outer walls of the receptacle 36 through the perforations 41, with which the side walls are provided, where it will not be affected by the current of rising gas and will then drop down into the channel 33 formed by the upwardly turned annular flange or projection 32, from whence it will be drained by the spout 35 into the lower part of the basin formed by the upper face of deflector 27, and be returned to the bottom of the purifying chamber 4 through drain pipe 31. Spout 35 is made to discharge into the basin formed by deflector 27 a considerable distance below the path of the gas entering the basin formed by deflector 27, where the current of gas passing around the upper edge of deflector 27 will not come into contact with the drained fluid.

The construction shown and described we believe to be the simplest and most efficient form of our invention, especially adapted for use in purifying or "scrubbing" generated oxygen through the medium of sodium hydroxid; but it is apparent that the construction may be modified in certain details without, however, departing from the spirit of our invention.

What we claim is:

1. An apparatus of the class described, comprising a liquid retaining receptacle, a conduit for conveying impure gas into the receptacle, the discharge end of the conduit being arranged in proximity to the bottom of the receptacle and adapted to divide the inflowing gas into small streams or jets, a gas-receiving chamber communicating with the upper part of the receptacle, filtering means arranged within said chamber, and means arranged about the lower part of the filtering means whereby the accumulated matter separated from the gas is conveyed into the receptacle out of the path of the gas.

2. An apparatus of the class described, comprising a liquid retaining receptacle, a conduit for conveying impure gas into the receptacle, means whereby the inflowing gas is delivered beneath the normal level of the liquid in the receptacle and divided into small streams or jets, a gas-receiving chamber communicating with the upper part of the receptacle, a filtering material containing receptacle located at the point of communication between the gas chamber and first mentioned receptacle, and means whereby the accumulated foreign material separated from the gas is conveyed out of the path of the rising gas.

3. An apparatus of the class described, comprising a liquid retaining receptacle, a conduit for conveying impure gas into the receptacle, means whereby the inflowing gas is divided into streams or jets and delivered beneath the normal fluid level in the receptacle, a gas receiving chamber communicating with the upper part of the receptacle, means arranged in the path of the rising gas and in advance of the point of communication between said chamber and the receptacle whereby the gas is deflected and the heavier particles precipitated, filtering means located intermediate of the deflecting means and the discharge end of said gas chamber, and means whereby the accumulated matter separated from the gas by said filtering means is conveyed into the receptacle out of the path of the gas.

4. An apparatus of the class described, comprising a liquid retaining receptacle, a conduit for conveying impure gas into the receptacle, the discharge end of the conduit extending into proximity to the bottom of the receptacle and arranged to divide the inflowing gas into small streams or jets, a gas-receiving chamber communicating with the upper part of the receptacle, and an inverted cone shaped deflector arranged about the point of communication between said chamber and the receptacle, the upper edges of said deflector being curved downwardly whereby the rising gas is deflected in its course and heavier matter precipitated to the bottom of the receptacle.

5. An apparatus of the class described, comprising a liquid retaining receptacle, a conduit for conveying impure gas into the receptacle, the discharge end of the conduit being arranged in proximity to the bottom of the receptacle and adapted to divide the inflowing gas into small streams or jets, a gas-receiving chamber communicating with the upper part of the receptacle, an inverted cone shaped deflector arranged in advance of the point of communication between the receptacle and said gas chamber, and filtering means arranged intermediate of the deflector and the discharge end of said chamber.

6. An apparatus of the class described, comprising a liquid retaining receptacle, a conduit for conveying impure gas into the receptacle, a gas chamber communicating with the upper part of the receptacle, a funnel shaped deflector arranged in the path of the rising gas and in advance of the point of communication between said chamber and receptacle, means arranged about the point of communication between the chamber and receptacle whereby the gas is given a substantially perpendicular zig zag course before entering said chamber and material entrained with the gas precipitated into said deflector, and means whereby the precipitated material in the deflector is conveyed into the bottom of the receptacle.

7. An apparatus of the class described, comprising a liquid retaining receptacle, a conduit for conveying liquid into the receptacle, a second conduit for conveying impure gas into the receptacle, means whereby the inflowing gas is divided into small streams or jets and discharged beneath the normal level of fluid in the receptacle, a gas chamber communicating with the upper part of the receptacle, the inlet end of said chamber being provided with an annular channel, means mounted in said channel and adapted to be provided with material whereby particles of liquid entrained with the gas will be separated therefrom and delivered in said channel, and means whereby the separated liquid is conveyed into the receptacle out of the path of the rising gas.

8. An apparatus of the class described, comprising a liquid retaining receptacle, a conduit for conveying impure gas into the receptacle, a gas chamber communicating with the upper part of the receptacle, a downwardly presented funnel shaped deflector having a downwardly curved upper edge arranged in advance of the point of communication between said chamber and receptacle, and means arranged within the deflector whereby the gas passing around the upper edge of the deflector is given a downward and then an upward course inside the deflector and the heavier particles entrained precipitated into the bottom of the deflector.

HENRY W. JACOBS.
HOWARD H. LANNING.

Witnesses:
FRANK MITCHELL,
C. W. WRIGHT.